United States Patent [19]

Bartenstein

[11] 3,907,385
[45] Sept. 23, 1975

[54] ARRANGEMENT FOR GUIDING PRESS RAMS

[75] Inventor: Michael F. Bartenstein, Proctor, Vt.

[73] Assignee: Vermont Marble Company, Proctor, Vt.

[22] Filed: Aug. 26, 1974

[21] Appl. No.: 500,719

[52] U.S. Cl. .................. 308/6 C; 308/3 A; 308/3.5
[51] Int. Cl.² ......................................... F16C 31/06
[58] Field of Search ............ 308/3 R, 3 A, 3.5, 5 R, 308/6 R, 6 C, 176; 100/214, 224, 226; 408/237; 51/92 R; 184/14

[56] References Cited
UNITED STATES PATENTS

| | | |
|---|---|---|
| 2,083,682 | 6/1937 | Balsiger et al. ................... 308/3 A |
| 3,000,674 | 9/1961 | Ford .................................. 308/6 C |
| 3,044,835 | 7/1962 | Hurd ................................. 308/6 C |
| 3,190,703 | 6/1965 | Thomson et al. ................. 308/6 C |
| 3,311,426 | 3/1967 | Binns ................................ 308/6 C |

Primary Examiner—Lloyd L. King
Assistant Examiner—Randolph A. Reese
Attorney, Agent, or Firm—Bacon & Thomas

[57] ABSTRACT

A machine has a bed for receiving a ram, the bed having at least one supporting rail mounted longitudinally thereon, and two spaced guiding rails mounted vertically above the supporting rail. The ram carries supporting bearing means engaged with the supporting rail, a pair of spaced vertical guide bearing means engaged with the undersides of the two guiding rails, and two spaced, oppositely directed horizontal guide bearing means engaged with the confronting surfaces of the guiding rails. The arrangement provides precise guiding for the ram, with full anti-friction bearing mounting.

8 Claims, 5 Drawing Figures

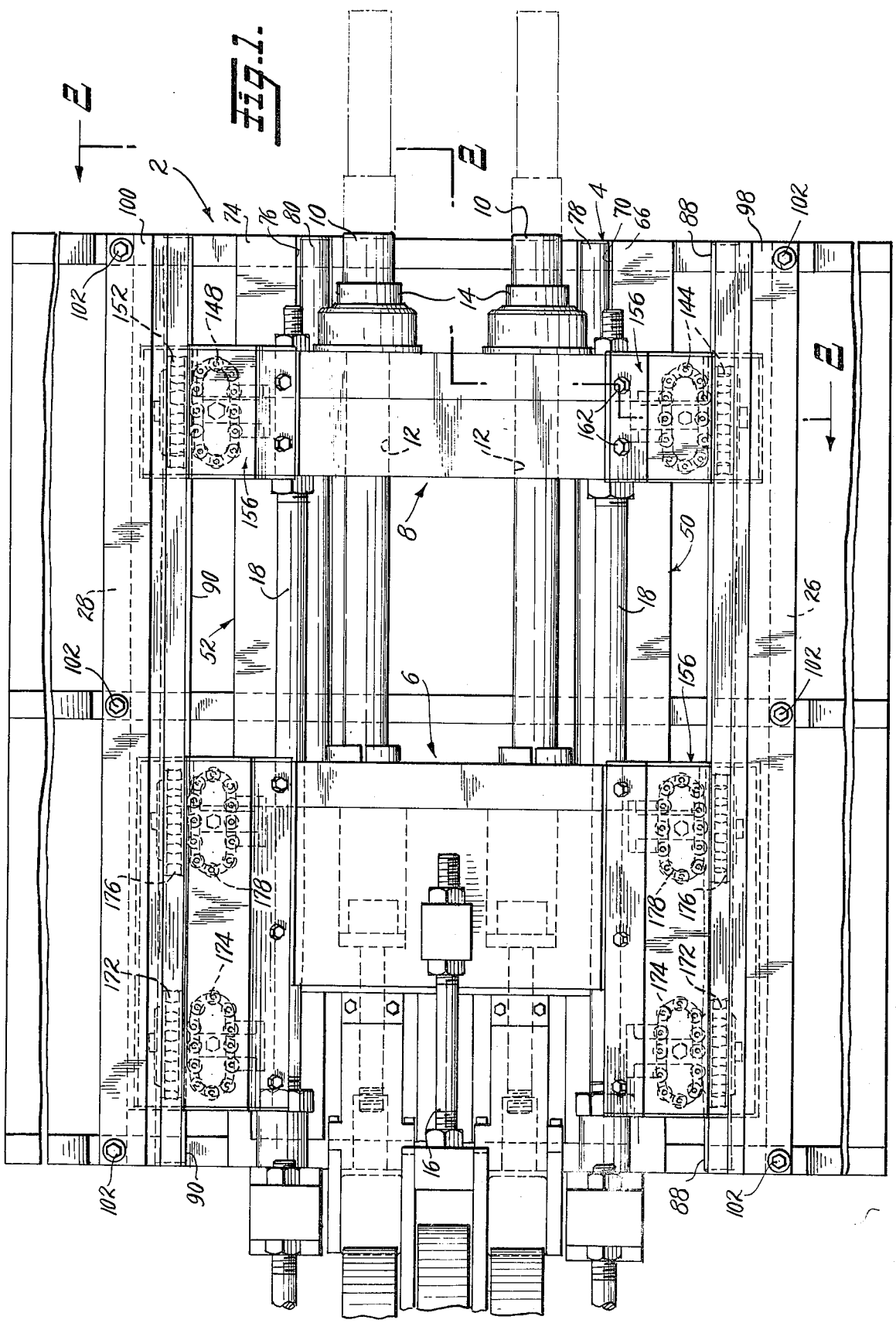

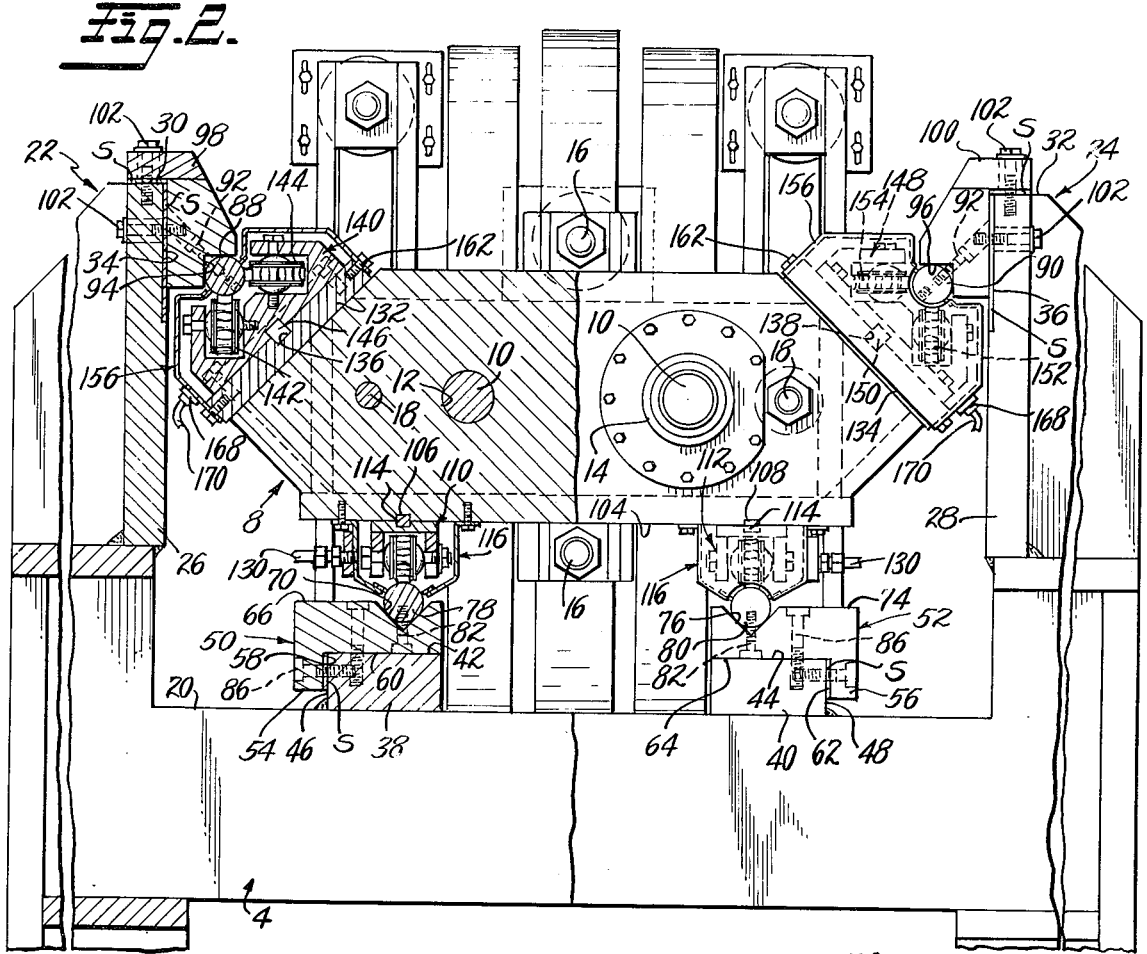
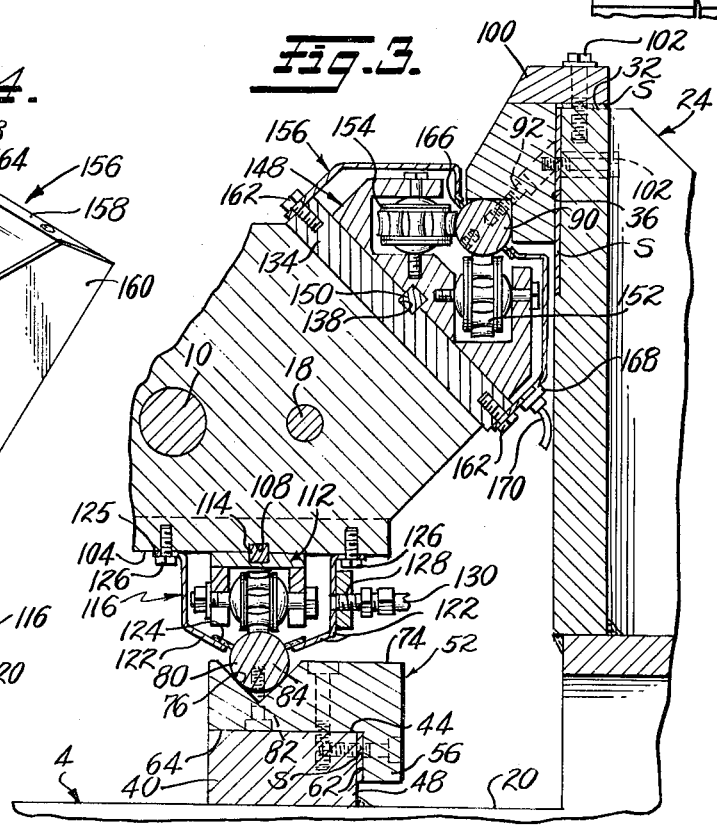
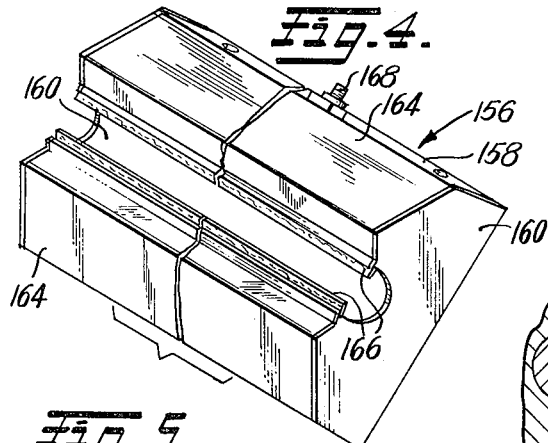
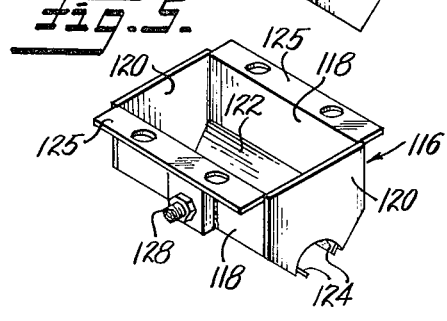

ARRANGEMENT FOR GUIDING PRESS RAMS

BACKGROUND OF THE INVENTION

1. Field of the Invention

The present invention relates generally to arrangements for guiding a moveable ram in a machine, and more particularly to an adjustable arrangement for precisely guiding a moveable ram while providing for antifriction mounting thereof effective to reduce friction and wear to a minimum.

2. Description of the Prior Art

There are many instances in machine construction where a moveable element like a ram must make repeated reciprocating movements, and where precise alignment of the ram during those movements is required. Typical of such machines are drawing presses, where a ram is utilized to shape a metal blank within a die.

The traditional manner for mounting such rams has been with the use of solid ways machined to fine tolerance, upon which the moveable ram is mounted. While effective guiding of the ram occurs with this arrangement, high friction results and can cause excessive wear, heat and overall waste of energy. Attempts have been made to utilize bearings for mounting the ram to overcome the friction problem, but difficulty has been encountered in providing for adjustments and in keeping the ram in a precise aligned relationship.

There have been two basic approaches taken in the use of bearings for mounting rams. The first approach makes use of conventional machined ways, wherein the ram carries some type of bearing arrangement that rides on the ways. Typical machines incorporating this concept are shown in prior U.S. Pat. Nos. 1,881,508, 1,910,534, 2,185,304, 2,288,420, 2,315,846, and 3,122,133.

The second approach, and the one to which this invention more directly relates, has been to utilize separate cylindrical rails that inherently reduce friction, upon which the ram rides. Typical machines incorporating such cylindrical rails are shown in U.S. Pat. Nos. 1,872,718, 2,083,682, 2,049,394, 2,139,234, 2,654,640, 2,832,651 and 3,427,080. The last of these patents shows the combination of bearing units on the ram, arranged to ride on the cylindrical rails.

It is evident that there has been considerable inventor activity in an effort to find a preferable arrangement for mounting a moveable element or ram on a bed, whereby to overcome friction and still provide precision guidance. Despite all the efforts of the past, however, no mounting arrangement has been proposed that is easily adjustable to provide precision guidance of the moveable element or ram, that is relatively simple mechanically to construct and maintain, and which reduces friction losses to the absolute minimum. The present invention is intended to provide such an optimum arrangement for mounting a moveable machine element or ram.

SUMMARY OF THE INVENTION

The present invention makes use of both cylindrical rails, mounted in such a manner that they can be adjusted with precision, and anti-friction bearing means riding in engagement with the cylindrical rails. The cylindrical rails and the bearing means are arranged in a unique configuration so as to eliminate both lateral and vertical movements of the ram, whereby wear is reduced to an absolute minimum.

The ram or moveable element of the present invention is intended to be mounted for reciprocating movement on a machine bed, and the bed includes a generally horizontal supporting surface having spaced, upright generally vertical frame members disposed on opposite sides thereof. Mounted on the supporting surface by an adjustable mounting means is at least one longitudinally extending rail, comprised of a precision cylindrical member that can be rotated to different positions so that different wear surfaces are presented. While one supporting rail can be adequate in some machines, in the preferred embodiment two spaced, parallel supporting rails are utilized to provide a firmer, more stable base for the moveable element or ram. Mounted on the upright vertical members above the supporting rails are two precision guiding rails, the guiding rails being cylindrical also, and being mounted on the upright frame members by mounting means that are also adjustable. The mounting means utilized to mount both the guiding rails and the supporting rails are designed to utilize shims for obtaining a precise relationship wherein the axes of all the rails lie exactly parallel to one another. Like the supporting rails, the guiding rails are arranged so that they can be rotated to present different wear surfaces.

The ram or moveable element carries supporting bearing means on the lower portion thereof, arranged to ride on the supporting rails, the bearing means for each rail lying in a vertical plane also containing the axis of the associated supporting rail. The bearing unit utilized is of the roller chain type, which features a substantial linear contact with the cylindrical rail that increases the precision guidance feature of the invention, and resists tipping of the ram.

The ram is disposed between the supporting rails and the guiding rails, and on the upper end thereof carries a pair of vertical guide bearing units, one in contact with the undersurface of each guiding rail. The vertical guide bearing units are also preferably of the roller chain type, and lie in vertical planes that contain the axis of their associated guiding rail. Taken together, the vertical guide bearing units and their associated guiding rails and the supporting bearing units and their associated supporting rails strictly confine the moveable ram vertically, so that no stray vertical movement is possible. Also mounted on the upper end of the ram are oppositely directed horizontal guide bearing units that engage the inner, confronting surfaces of the two guiding rails. The horizontal guide bearing units are also preferably of the roller chain type, lie in horizontal planes that also contain the axis of their associated guiding rail, and function to strictly confine the moveable element or ram against any stray horizontal movements.

The ram is thus mounted for strict linear motion, along a precision path. To further reduce friction and ensure smooth reciprical movement of the ram, the bearing units are enclosed with lubrication housings where they engage their respective rails, and the engaged surfaces are maintained in a bath of lubricating liquid.

It is the principal object of the present invention to provide an arrangement for mounting a moveable element or ram upon a machine bed, whereby the ram is confined to precision linear movements, and friction losses and wear are reduced to an absolute minimum.

A further object is to provide a ram mounting arrangement wherein adjustments can be easily made to ensure linear ram movements along a desired precision path.

Another object is to provide a ram mounting arrangement utilizing cylindrical rails, wherein the rails are mounted so that they can be rotated to present a plurality of wear surfaces.

Other objects and many of the attendant advantages of the invention will become readily apparent from the following Description of the Preferred Embodiment, when taken in conjunction with the accompanying drawings.

BRIEF DESCRIPTION OF THE DRAWINGS

FIG. 1 is a top, fragmentary plan view of a horizontal press bed having a draw ram and a redraw sleeve ram mounted thereon, the two rams being carried by cylindrical supporting and guiding rails arranged according to the invention;

FIG. 2 is a vertical end view, partly in section, taken along the line 2—2 in FIG. 1, and showing in detail the relative arrangement of the two supporting rails, the two guiding rails, and the bearing units carried by the redraw sleeve ram;

FIG. 3 is a fragmentary, enlarged sectional view showing in further detail the relationships between one set of horizontal and vertical bearing units and their associated guiding rail, and in particular illustrating the mounting bracket and shim arrangement for mounting and adjusting the guiding rail;

FIG. 4 is a fragmentary, perspective view of one of the lubrication housings for covering a set of horizontal and vertical guiding bearing units; and FIG. 5 is a perspective view of one of the lubrication housings for covering one of the supporting bearing units.

DESCRIPTION OF THE PREFERRED EMBODIMENT

Referring now to the drawings, a machine for use in manufacturing can-like objects from a metal blank is shown generally at 2, the machine 2 including a horizontal bed 4 upon which two rams 6 and 8 are mounted for reciprocal movement. While the invention will be described in connection with a can-making machine, it is to be understood that this is for illustrative purposes only, and that in fact the moveable element or ram mounting arrangement of the invention can also be used with a variety of other machines utilizing such reciprocating ram elements.

The details of the can-making machine 2 are not important to the present invention, except to note that the ram 6 is designated a draw ram and carries thereon a pair of forming die rods 10 that extend forwardly through aligned passageways 12 in the redraw ram 8, the redraw ram 8 having shaping sleeves 14 mounted on the front face thereof surrounding the die rods 10. Both the draw ram 6 and the redraw ram 8 are mounted for reciprocal movement, the draw ram 6 being powered by shafts 16 leading from a power unit (not shown), and the redraw ram 8 being powered by parallel side shafts 18 also leading from a power unit (not shown).

Turning now to the ram mounting arrangement of the present invention, the bed 4 of the machine 2 includes a generally horizontal supporting surface 20. Two spaced, upright vertical frame members 22 and 24 are disposed on opposite sides of the supporting surface 20, and extend for a substantial distance thereabove. The vertical frame members 22 and 24 include rectangular mounting plates 26 and 28, having flat upper horizontal shim-receiving surfaces 30 and 32, respectively, and flat vertical shim-receiving surfaces 34 and 36 that meet the surfaces 30 and 32 to define a corner. The horizontal shim-receiving surfaces 30 and 32 are arranged at a precise 90° angle to their respective vertical shim-receiving surfaces 34 and 36.

Secured to the supporting surface 20 are two parallel, rectangular mounting strips 38 and 40 having flat, machined top surfaces 42 and 44 and vertical outer side surfaces 46 and 48, respectively. Received on the mounting strips 38 and 40 are L-shaped mounting brackets 50 and 52 incorporating downturned legs 54 and 56, respectively, that are engaged over the vertical outer side surfaces 46 and 48. The inner vertical and horizontal surfaces 58 and 60 of the bracket 50 are machined flat and are arranged at a 90° angle to each other, the same being true for the inner surfaces 62 and 64 of the bracket 52. The top surface 66 of the bracket 50 has a V-shaped holding groove 70 machined therein, the sides thereof being disposed at a 90° angle to each other. Similarly, the top surface 74 of the bracket 52 has a similar V-shaped holding groove 76 therein.

Received in the V-shaped grooves 70 and 76 are precision shaped cylindrical supporting rails 78 and 80, the rails being secured in place by machine screws 82. A feature of the invention is that the rails 78 and 80 are provided with circumferentially spaced threaded bores 84 arranged to receive the screws 82, whereby they can be removed and rotated to present a different wear surface when desired. This of course prolongs the life of the rails.

The mounting brackets 50 and 52 are first placed on their respective mounting strips 38 and 40, and the precise desired parallel, spaced alignment thereof is obtained by inserting suitable shims S between the brackets 50 and 52 and their mounting strips. When the desired alignment is obtained, the brackets 50 and 52 are secured to their mounting strips 38 and 40 by machine screws 86.

In a similar manner precision cylindrical guiding rails 88 and 90 are secured by machine screws 92 to the walls of V-shaped, precision machined grooves 94 and 96 provided in guide mounting brackets 98 and 100, the brackets 98 and 100 in turn being secured to the upper, inner corners of the mounting plates 26 and 28, respectively, by the use of screws 102. Again, shims S are utilized where needed, to obtain the desired aligned relationships.

Both of the ram members 6 and 8 are mounted for reciprocal motion on the two supporting rails 78 and 80 and the guiding rails 88 and 90. The redraw ram 8 includes a flat bottom face 104, in which rectangular, parallel slots 106 and 108 are formed. Bearing units 110 and 112 are secured to the bottom face 104, the bearing units also having rectangular slots therein. Precise alignment of the bearing units 110 and 112 is obtained by machined rectangular keys 114 seated in the slots in the bearing units, and received in the parallel slots 106 and 108 on the ram bottom face 104.

The bearing units 110 and 112 are of the roller chain type, which present a relatively long and linear bearing surface. Bearing units of this type are commercially available, and a typical example of how they are constructed is contained in U.S. Pat. No. 3,655,247, reference to which is hereby made for a more detailed description. Essentially, such bearing units include a housing containing a continuous bearing chain that rolls freely and with minimum friction.

In the invention the bearing units 110 and 112 are arranged so that the roller chains thereof lie in vertical planes, which planes also contain the axis of their respective supporting rails 78 and 80. By use of the bearing units 110 and 112, therefore, the ram 8 is supported for reciprocal movement upon the supporting rails 78 and 80, and can move therealong with a minimum of friction. The elongated linear bearing surface provided by the units 110 and 112 is an important feature of the invention, for such eliminates the problems associated with the point contact present when simple roller wheels like those shown in previously mentioned U.S. Pat. No. 3,427,080 are employed to support a carriage or ram on a cylindrical rail. Specifically, the degree of force applied to a given point on the supporting rail is lessened, thereby lessening wear and requiring less adjustment during use, and in addition greater stability against any tendency of the ram to tip or chatter is obtained.

In order to further reduce friction and wear, it is desireable to have the engaged surfaces of the bearing units 110 and 112 and the supporting rails 78 and 80 bathed in a lubricating liquid, and for this purpose a sheet metal lubrication housing 116 is installed over each bearing unit. Each housing 116, as best shown in FIG. 5, comprises vertical side walls 118 and end walls 120, and inwardly-inclined bottom walls 122 that are spaced apart to receive the supporting rails 78 and 80. The lower edges of the inclined bottom walls 122 carry wipers 124 that run the length thereof, and which are made of fabric, a resilient material, or some other suitable material. The wipers 124 are arranged to ride in very light engagement with the supporting rails 78 and 80.

The upper edges of the sidewalls 118 have flanges 125 thereon, and the housings 116 are secured over their respective bearing units 110 and 112 by screws 126 passed through holes in said flanges and into the bottom face 104 of the redraw ram 8. A nipple fitting 128 is mounted to one of the sidewalls 118, and a liquid lubricant supply conduit 130 is connected thereto and leads to a supply reservoir (not shown). The supply of liquid lubricant to the housings 116 is arranged so that at least the engaged surfaces of the bearings and the supporting rails are continuously bathed in lubricant, the wipers 124 serving to contain the lubricant against excessive losses. The resultant arrangement results in a minimum of friction, especially when the parallel rails 78 and 80 are adjusted through the use of the shims S to be exactly parallel.

Moving now to the area of the guiding rails 88 and 90, the upper corners of the redraw ram 8 have flat mounting plates 132 and 134 mounted thereon, arranged to lie at a 45° angle. The plates 132 and 134 have rectangular slots 136 and 138 therein, respectively, corresponding to the slots 106 and 108.

Secured to the mounting plate 132 is a mounting bracket 140 carrying two bearing units 142 and 144, the rear surface of the bracket having a slot machined therein to receive an aligning key 146. Similarly, a mounting bracket 148 aligned with a machined key 150 is attached to the mounting plate 134, and carries two bearing units 152 and 156. The bearing units 142, 144, 152 and 156 are all of the same type as the bearing units 110 and 112, and thus offer substantial linear bearing surfaces.

Turning first to the bearing units 142 and 152, such are vertically disposed and are arranged to be in engagement with the undersurfaces of the guiding cylindrical rails 88 and 90, respectively, the bearing roller chains of said units 142 and 152 lying in vertical planes that also contain the axes of their respective guiding rails. The bearing units 142 and 152 are thus vertical guide bearings, and it is seen that the action of such with their associated rails 88 and 90 combined with the supporting bearings 110 and 112 and their supporting rails 78 and 80 serves to strictly confine the redraw ram 8 against any vertical movements. The brackets 50, 52, 98 and 100 are so set in place initially as to place the rails 78, 80, 88 and 90 in precise parallel relationship, so that no binding occurs at any of the bearing units, and the linear nature of the supporting bearing units 110 and 112 and of the vertical guide bearing units 142 and 152 eliminates any tendency at tipping. Thus, friction and wear are held to an absolute minimum. To further assist in maintaining the proper alignments, advantage can be taken of the minute adjustment capability incorporated into convential bearing units of the type employed in the invention.

Referring now to the two bearing units 144 and 154, such are disposed horizontally and extend oppositely to engage the inner surfaces of the guiding rails 88 and 90, respectively, the bearing elements of said units lying in horizontal planes that also contain the axes of their respective guiding rail. The units 144 and 154 are thus horizontal guide bearings, and together with their associated guiding rails 88 and 90 confine the redraw ram 8 against any horizontal movements. Again, the linear nature of the bearing units 144 and 154 resists any tendancy of the ram 8 to twist about a vertical axis, thereby helping to assure a smooth reciprocal movement.

In order to lower friction losses to the absolute minimum, the bearing units 142 and 144 and the units 152 and 154 are enclosed by covers 156 similar in construction and purpose to the covers 116, the construction of one of the covers 156 being illustrated in FIG. 4. Referring to said FIG. 4, the cover 156 includes vertical side walls 158 and vertical end walls 160, which are telescopically received over the mounting blocks 132 and 134 and secured by screws 162. Angled bottom walls 164 on the covers 156 terminate in a slot for receiving the guiding rails 88 and 90, and are fitted with wipers 166 that function like the wipers 124. A fitting 168 on each cover 156 is connected to a conduit 170 leading from a reservoir (not shown) of lubricating liquid, and the arrangement functions to keep the engaged bearing surfaces at the guiding rails 88 and 90 continuously bathed in lubricating liquid.

It is readily seen that the unique mounting arrangement of the invention can be easily adjusted for the precision parallel relationships required between the supporting rails and the guiding rails, and that the supporting bearing units, the vertical guide bearing units, and the horizontal guide bearing units all cooperate to confine the ram to strict reciprocal movement along a fixed, precision path. In addition, the linear nature of the bearing units prevents any tendency of the ram to tip and thereby ensures smooth movement, and the bearing units coupled with the lubricant bath on each bearing surface reduce both friction and wear to a minimum. The arrangement of the invention thus avoids all the problems of prior arrangements for the same general purpose.

Turning now to the draw ram 6, such is a larger unit than is the redraw ram 8. However, it is mounted in essentially the same manner as the unit 6, except that twice the number of bearing units is employed. More specifically, the draw ram 6 is provided with an aft set of supporting bearing units (not shown), vertical guide bearing units 172, and horizontal guide bearing units 174, and also with a forward set of supporting bearing units (not shown), vertical guide bearing units 176, and horizontal guide bearing units 178. Should a ram or moveable element of unusual length be required, then additional sets of bearings can be provided, as needed. Such multiple set bearing arrangements function like the single set arrangement mounted on the redraw ram 6, to provide smooth and nearly friction-free movement.

It has been found in practice that the best manner for establishing the parallel relationships among the various rails is to first establish a fixed horizontal surface on the supporting rail mounting brackets, and then a fixed vertical surface on one of the upper guide rail mounting brackets. The other rail mounting brackets are then adjusted against these fixed bases, which provides a rational and orderly manner of obtaining the desired parallelism.

Obviously, many variations and modifications of the invention are possible.

I claim:

1. In a machine, a bed for reciprocably carrying a moveable machine element, said bed including a generally horizontal supporting surface, and a pair of spaced upright frame members disposed on opposite sides of said supporting surface; at least one supporting rail; means mounting said supporting rail on said supporting surface to extend longitudinally thereof; a pair of guiding rails; means mounting said guiding rails on said upright frame members in generally confronting relationship, the axes of said supporting and said guiding rails all being parallel to each other; a moveable machine element received between said supporting rail and said guiding rails; supporting bearing means carried by said machine element and resting on said supporting rail, said supporting bearing means being in contact with the upper surface of said supporting rail and lying in a vertical plane containing the axis of said supporting rail; a pair of spaced vertical guide bearing means carried on the upper portion of said moveable element, said vertical guide bearing means each being in contact with the underside of one of said guiding rails and lying in a vertical plane also containing the axis of its associated guiding rail; and a pair of horizontal guide bearing means, mounted on the upper, opposite end portions of said moveable element, said horizontal guide bearing means each being in contact with the inner side of one of said confronting guiding rails and lying in a horizontal plane containing the axis of its associated guiding rail.

2. In a machine as recited in claim 1, including additionally cover means over each of said bearing means and arranged to engage the associated rail, and means for supplying a liquid lubricant to each of said cover means.

3. In a machine as recited in claim 1, wherein each of said bearing means is in linear engagement over a substantial distance with its associated rail.

4. In a machine as recited in claim 1, wherein said supporting rails and said guiding rails are all cylindrical in shape.

5. In a machine as recited in claim 1, wherein said means mounting said supporting rails and said means mounting said guiding rails are all adjustable, whereby to provide for establishing a precision parallel relationship among said rails.

6. In a machine, a bed for reciprocably carrying a moveable machine element, said bed including a generally horizontal supporting surface, and a pair of spaced upright frame members disposed on opposite sides of said supporting surface; at least one cylindrical supporting rail; means mounting said supporting rail on said supporting surface to extend longitudinally thereof, said mounting means being adjustable for adjusting the position of said supporting rail; a pair of cylindrical guiding rails; means mounting said cylindrical guiding rails on said upright frame members, said means being adjustable for adjusting the position of said guiding rails, and the axes of said supporting and said guiding rails all being parallel to each other; a moveable machine element received between said supporting rail and said guiding rails; a supporting bearing means carried by said machine element and resting on said supporting rail, said supporting bearing means being in contact with the upper surface of said supporting rail for a substantial linear distance; first lubrication housing means enclosing said supporting bearing means and engaged with said supporting rail; two vertical guide bearing means carried on the upper portion of said moveable element, said vertical guide bearing means each being in contact with the underside of one of said guiding rails for a substantial linear distance; two horizontal guide bearing means mounted on the upper, opposite end portions of said moveable element, said horizontal guide bearing means each being in contact with the inner side of one of said confronting guiding rails for a substantial linear distance; second lubrication housing means enclosing said vertical and said horizontal guide bearing means and in engagement with said guiding rails; and means for supplying liquid lubricant to said first and said second lubrication housing means.

7. In a machine as recited in claim 6, wherein said means mounting said supporting rail comprises: a rectangular mounting bar on said horizontal supporting surface; a downwardly facing, L-shaped support bracket having a V-shaped groove on its upper surface for receiving said cylindrical supporting rail; means securing said supporting rail within said V-shaped groove; shim means for insertion as needed between the inner surfaces of said downwardly facing L-shaped support bracket and said mounting bar; and fastener means for securing said L-shaped support bracket to said mounting bar.

8. In a machine as recited in claim 7, wherein said means mounting said guiding rails comprises: an L-shaped guide bracket for each of said guiding rails, arranged to be engaged over the upper edge of the associated on of said upright frame member, said L-shaped guide bracket having a V-shaped groove therein for receiving said cylindrical guiding rail; means securing said guiding rail within said V-shaped groove; shim means for insertion as needed between the inner surfaces of said L-shaped guide bracket and the upper edges of said upright frame member; and fastener means for securing said L-shaped guide bracket to said upright frame member.

* * * * *